US012753725B1

(12) United States Patent
O'Brien et al.

(10) Patent No.: US 12,753,725 B1
(45) Date of Patent: Oct. 6, 2026

(54) AIR BLEED SLOTS FOR GAS TURBINE ENGINES

(71) Applicant: Pratt & Whitney Canada Corp., Longueuil (CA)

(72) Inventors: James O'Brien, Hamilton (CA); David Hill, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/249,807

(22) Filed: Jun. 25, 2025

(51) Int. Cl.

| | |
|---|---|
| ***F02C 9/18*** | (2006.01) |
| ***F01D 9/04*** | (2006.01) |
| ***F04D 27/00*** | (2006.01) |

(52) U.S. Cl.
CPC ................ *F02C 9/18* (2013.01); *F01D 9/041* (2013.01); *F04D 27/009* (2013.01); *F05D 2240/12* (2013.01); *F05D 2260/606* (2013.01)

(58) Field of Classification Search
CPC ............................... F01D 9/041; F04D 27/009
See application file for complete search history.

(56) References Cited

U.S. PATENT DOCUMENTS

| | | | |
|---|---|---|---|
| 6,550,254 | B2 | 4/2003 | Proctor et al. |
| 6,663,346 | B2 | 12/2003 | Munsell et al. |
| 7,594,793 | B2 | 9/2009 | Guemmer |
| 8,292,567 | B2 | 10/2012 | Damle et al. |
| 9,677,472 | B2 | 6/2017 | Travis et al. |
| 10,227,930 | B2 | 3/2019 | Saxena et al. |
| 2008/0072566 | A1 | 3/2008 | Eleftheriou et al. |
| 2018/0119619 | A1 | 5/2018 | Watson et al. |

FOREIGN PATENT DOCUMENTS

| | | | |
|---|---|---|---|
| EP | 1561911 | A1 | 8/2005 |

*Primary Examiner* — Brian O Peters
(74) *Attorney, Agent, or Firm* — CANTOR COLBURN LLP

(57) ABSTRACT

Stator assemblies for gas turbine engines include a stator and a set of stator vanes. A bleed aperture is defined between first and second stator vanes having respective vane camber lines. A channel is defined between the stator vanes and a mid-channel line is defined equidistant between the first and second vane camber lines and follows a parallel contour of the vane camber lines. The channel defines a covered portion between the stator vanes and has a forward end and an aft end defined relative to the vane leading and trailing edges. The bleed aperture defines an aperture center line and includes a leading edge section, a trailing edge section, and a primary aperture section defined therebetween, with a forward end no farther forward than a forward end of the covered portion and an aft end no farther forward than an aft end of the covered portion.

20 Claims, 12 Drawing Sheets

AIR BLEED SLOTS FOR GAS TURBINE ENGINES

BACKGROUND

The subject matter disclosed herein generally relates to gas turbine engines and, more particularly, to air bleed slots for gas turbine engines.

In aircraft gas turbine engines, air may be extracted from various stages of the engine and directed to other portions of the engine and/or used for other aircraft systems. For example, air may be extracted from compressor stages of the gas turbine engine to supply cooling air for turbine blades or may provide aircraft cabin air. In some aircraft, bleed air may be used for multiple purposes.

Aircraft systems may therefore require at least a minimum flow rate of bleed air at a particular temperature and pressure. Existing bleed air systems typically have slots which divert bleed air at an angle perpendicular to the main gas path through the engine. Such bleed slots may result in irreversible flow losses, which may in turn undermine flow efficiency and reduce temperature and pressure of bleed air. Losses in the bleed air system may require additional air to be bled from the bleed system. Additionally, typical engine configurations may include bleed slots on a shroud of a staged axial turbo-engine that are typically shaped as circles or ovals. These bleed slots may be placed in between rotor and stator blades of a stage, or in the openings between adjacent stator blades. However, with increased blade count and/or smaller shroud radii, the amount or space of structural material from the edge of a brazed vane to an open bleed slot is reduced. This provides challenges for manufacturing, dynamics, and structures due to reduced surface area and space from vane to bleed slot.

SUMMARY

According to some embodiments, stator assemblies for gas turbine engines are provided. The stator assemblies include a stator structure configured to be arranged about an engine axis, a plurality of stator vanes extending radially inward from the stator structure, with each stator vane defining a respective vane camber line, and a plurality of bleed apertures defined in the stator structure. One bleed aperture is defined between each set of two adjacent stator vanes of the plurality of stator vanes. A first bleed aperture of the plurality of bleed apertures is defined between a first stator vane having a first vane camber line and a second stator vane having a second vane camber line. A channel is defined between the first stator vane and the second stator vane and a mid-channel line is defined as equidistant between the first vane camber line and the second vane camber line and follows a parallel contour of the first and second vane camber lines. The channel defines a covered portion defined as a region between the first stator vane and the second stator vane and defined at a forward end by a line from a leading edge of the second stator vane drawn normal to the mid-channel line and extending to the first stator vane camber line and at an aft end by a line from a trailing edge of the first state vane drawn normal to the mid-channel line and extending to the second stator vane camber line. The first bleed aperture defines an aperture center line and includes a leading edge section defined at an upstream end of the first bleed aperture, a trailing edge section defined at a downstream end of the first bleed aperture, and a primary aperture section defined between the leading edge section and the trailing edge section. The primary aperture section has a forward end no farther forward than the forward end of the covered portion and the primary aperture section has an aft end no farther forward than the aft end of the covered portion.

In addition to one or more of the features described herein, or as an alternative, further embodiments of the stator assemblies may include that the primary aperture section is defined between a first aperture sidewall formed by a surface of the stator structure extending radially relative to the engine axis and second aperture sidewall formed by a surface of the stator structure extending radially relative to the engine axis.

In addition to one or more of the features described herein, or as an alternative, further embodiments of the stator assemblies may include that the leading edge section is defined by extensions of the first aperture sidewall and the second aperture sidewall that converge toward the aperture center line forward of the forward end of the primary aperture section.

In addition to one or more of the features described herein, or as an alternative, further embodiments of the stator assemblies may include that the leading edge section is rounded.

In addition to one or more of the features described herein, or as an alternative, further embodiments of the stator assemblies may include that the trailing edge section is defined by extensions of the first aperture sidewall and the second aperture sidewall that converge toward the aperture center line aft of the aft end of the primary aperture section.

In addition to one or more of the features described herein, or as an alternative, further embodiments of the stator assemblies may include that the trailing edge section is rounded.

In addition to one or more of the features described herein, or as an alternative, further embodiments of the stator assemblies may include that the forward end of the primary aperture section is aligned with the forward end of the covered portion.

In addition to one or more of the features described herein, or as an alternative, further embodiments of the stator assemblies may include that the forward end of the primary aperture section is located aft of the forward end of the covered portion.

In addition to one or more of the features described herein, or as an alternative, further embodiments of the stator assemblies may include that the primary aperture section is defined by two sidewalls that are a constant distance from the aperture center line along a length of the primary aperture section.

In addition to one or more of the features described herein, or as an alternative, further embodiments of the stator assemblies may include that the primary aperture section is defined by two sidewalls that are variable distances from the aperture center line along a length of the primary aperture section.

In addition to one or more of the features described herein, or as an alternative, further embodiments of the stator assemblies may include that the aperture center line is aligned with the mid-channel line.

In addition to one or more of the features described herein, or as an alternative, further embodiments of the stator assemblies may include that the aperture center line is defined parallel with the mid-channel line.

In addition to one or more of the features described herein, or as an alternative, further embodiments of the stator assemblies may include that the aperture center line is offset from the mid-channel line and closer to the first vane camber line than the second vane camber line.

According to some embodiments, gas turbine engines are provided. The gas turbine engines include a compressor section, a combustor section, and a turbine section arranged along an engine axis. At least one of the compressor section and the turbine section comprise a stator structure to be arranged about the engine axis. A plurality of stator vanes extend radially inward from the stator structure and each stator vane defines a respective vane camber line. A plurality of bleed apertures are defined in the stator structure, with one bleed aperture defined between each set of two adjacent stator vanes of the plurality of stator vanes. A first bleed aperture of the plurality of bleed apertures is defined between a first stator vane having a first vane camber line and a second stator vane having a second vane camber line. A channel is defined between the first stator vane and the second stator vane and a mid-channel line is defined as equidistant between the first vane camber line and the second vane camber line and follows a parallel contour of the first and second vane camber lines. The channel defines a covered portion defined as a region between the first stator vane and the second stator vane and defined at a forward end by a line from a leading edge of the second stator vane drawn normal to the mid-channel line and extending to the first stator vane camber line and at an aft end by a line from a trailing edge of the first state vane drawn normal to the mid-channel line and extending to the second stator vane camber line. The first bleed aperture defines an aperture center line and includes a leading edge section defined at an upstream end of the first bleed aperture, a trailing edge section defined at a downstream end of the first bleed aperture, and a primary aperture section defined between the leading edge section and the trailing edge section. The primary aperture section has a forward end no farther forward than the forward end of the covered portion and the primary aperture section has an aft end no farther forward than the aft end of the covered portion.

In addition to one or more of the features described herein, or as an alternative, further embodiments of the gas turbine engines may include that the primary aperture section is defined between a first aperture sidewall formed by a surface of the stator structure extending radially relative to the engine axis and second aperture sidewall formed by a surface of the stator structure extending radially relative to the engine axis.

In addition to one or more of the features described herein, or as an alternative, further embodiments of the gas turbine engines may include that the forward end of the primary aperture section is located aft of the forward end of the covered portion.

In addition to one or more of the features described herein, or as an alternative, further embodiments of the gas turbine engines may include that the primary aperture section is defined by two sidewalls that are a constant distance from the aperture center line along a length of the primary aperture section.

In addition to one or more of the features described herein, or as an alternative, further embodiments of the gas turbine engines may include that the primary aperture section is defined by two sidewalls that are variable distances from the aperture center line along a length of the primary aperture section.

In addition to one or more of the features described herein, or as an alternative, further embodiments of the gas turbine engines may include that the aperture center line is aligned with the mid-channel line.

In addition to one or more of the features described herein, or as an alternative, further embodiments of the gas turbine engines may include that the aperture center line is defined parallel with the mid-channel line.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Detailed descriptions of one or more embodiments of the disclosed apparatus and/or methods are presented herein by way of exemplification and not limitation with reference to the Figures.

Figure 1:
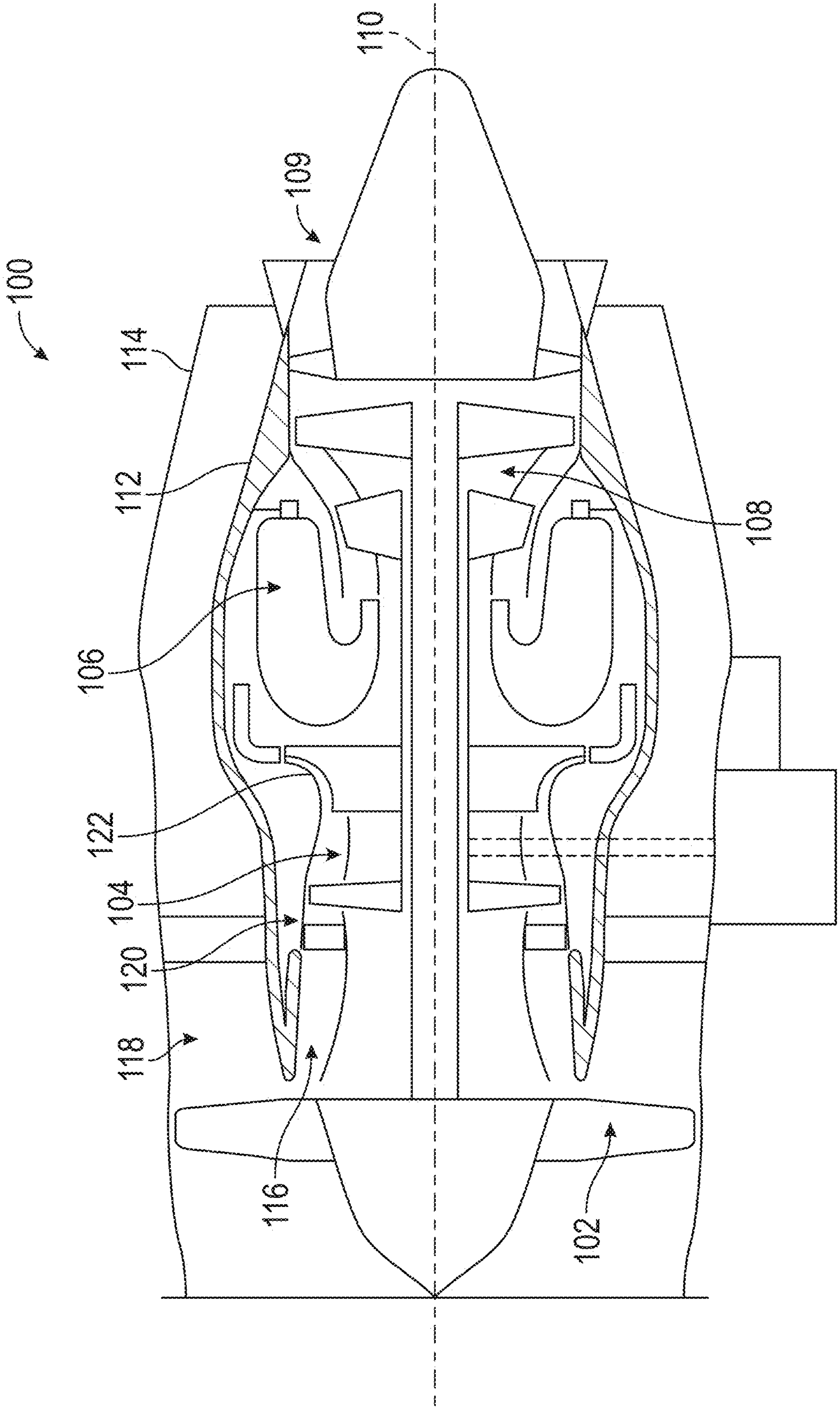
FIG. 1 is a schematic cross-sectional illustration of a gas turbine engine that may incorporate embodiments of the present disclosure.

FIG. 1 is a schematic illustration of a gas turbine engine 100 that may incorporate embodiments of the present disclosure. The gas turbine engine 100 includes, arranged in serial flow communication, a fan section 102 through which ambient air is propelled, a compressor section 104 for pressurizing the air, a combustor section 106 in which the compressed air is mixed with fuel and ignited for generating a stream of hot combustion gases, a turbine section 108 for extracting energy from the combustion gases, and an exhaust section 109 for expelling the hot gas to atmosphere. The sections 102, 104, 106, 108, 109 may be axially arranged along an engine axis 110 and arranged within an engine housing 112 which in turn is arranged within an engine nacelle 114. The gas turbine engine 100 defines a core flow path 116 directed from the fan section 102 and into the engine housing 112 through the compressor section 104, the combustor section 106, and the turbine section 108. A bypass flow path 118 is defined between the engine housing 112 and the engine nacelle 114. The flows, or portions thereof, of the core flow path 116 and the bypass flow path 118 may be mixed before exiting out of the exhaust section 109.

The gas turbine engine 100 may be mounted on an aircraft, such as on a wing, fuselage, tail, or the like. The gas turbine engine 100 is configured to generate and provide propulsion to the aircraft. The gas turbine engine 100 may be configured to generate propulsive thrust force, as depicted, or may be configured to provide torque to a shaft to drive a propeller or a rotor, as will be appreciated by those of skill in the art. In addition to generating a propulsive force or shaft torque, the gas turbine engine 100 may be configured to implement additional functions. For example, the gas turbine engine 100 may be configured to generate and provide a supply of pressurized air, which may be referred to as bleed air, to other aircraft systems. The other aircraft systems may be parts of the gas turbine engine 100 or may be parts or systems of the aircraft separate from the engine. In some configurations, the bleed air may be drawn from the compressor section 104 and supplied to various systems through a bleed duct 120. The bleed air may be, for example, used for cooling parts of the combustor section 106 and/or the turbine section 108. In some arrangements, the bleed air may be employed as a heat source or heat sink, for example, for cabin environmental controls, anti-icing systems, or the like. It will be appreciated that the bleed air may be extracted and directed to various onboard systems for various heating, cooling, lubricating, and/or pressurizing purposes. The bleed air may be extracted from the compressor section 104, and more particularly, may be extracted at or proximate to an impeller 122 of the compressor section 104. The impeller 122, as illustrated, is a centrifugal compressor that is arranged to turn an axial flow of the core flow through the core flow path 116 to a radial flow prior to mixing with fuel for combustion within the combustor section 106. It will be appreciated that the bleed air may be extracted from other locations or on engines having different configurations, such as those without a centrifugal compressor. That is, the present application is not intended to be limited to the specific engine configuration show in FIG. 1, but rather the gas turbine engine 100 is shown and described for illustrative and explanatory purposes only.

Figure 2:
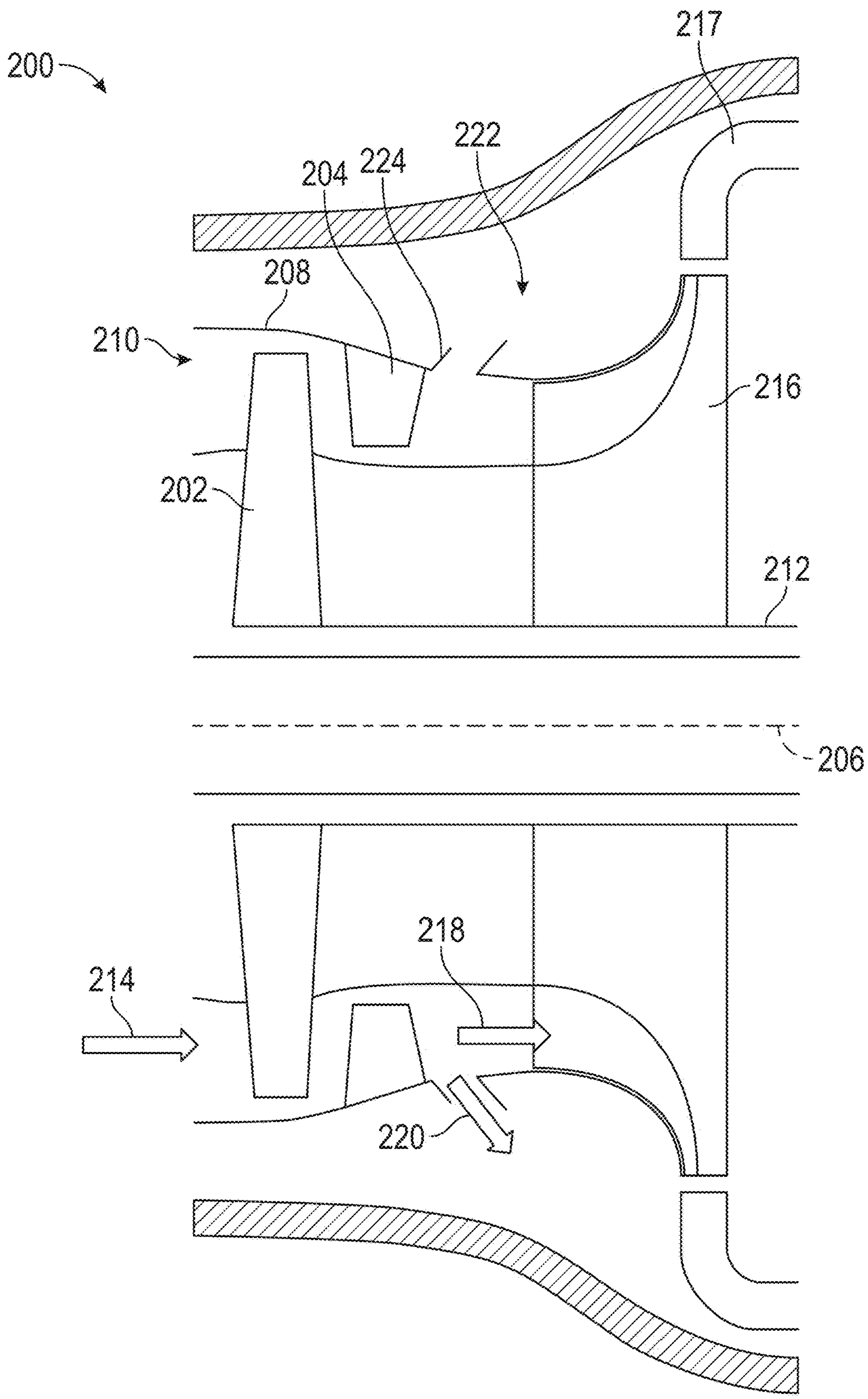
FIG. 2 is a schematic illustration of a portion of a compressor section of a gas turbine engine that may incorporate embodiments of the present disclosure.

Referring now to FIG. 2, a schematic illustration of a portion of a compressor section 200 of a gas turbine engine that may incorporate embodiments of the present disclosure is shown. The compressor section 200 includes one or more rotor(s) 202 and stator(s) 204 which are axially arranged along or relative to an engine axis 206. In the illustrative portion shown in FIG. 2, a single rotor 202 and a single downstream stator 204 is illustrated in an axial direction. However, it will be appreciated that multiple rotors and stators may be arranged serially along the compressor section 200 (e.g., multiple stages) in the axial direction. In some configurations, there also may be an impeller 216 and a diffuser 217. The impeller 216, as illustrated, is a centrifugal compressor that is arranged to turn an axial flow of the core flow through the core flow path 210 to a radial flow prior to entering the diffuser 217 which continues or extends radially and then turns axially, passing the flow to the combustor section where air is mixed with fuel for combustion. The rotor 202 and the stator 204 are arranged within a casing 208, which defines a portion of a core flow path 210. Each rotor 202 is mounted for rotation on or about an engine shaft 212 and each stator 204 is stationary relative to the rotor 202 and may be fixedly attached to or part of the casing 208. A core flow air 214 may be provided from, for example, an upstream section of the compressor section 200 or from a fan section, as described above. The core flow air 214 is compressed as it passes through the rotors 202 and stators 204 of the compressor section 200.

Each rotor 202 and each stator 204 is configured with a plurality of airfoil members (e.g., rotor blades and stator vanes) distributed around a circumference of the respective structure and about the engine axis 206. Each of the airfoil members is arranged to extend into the core flow path 210 to interact with a core flow therethrough. The rotor blades of the rotors 202 may be attached, affixed, or otherwise mounted on rotor disks or may be integrally formed with respective rotor disk(s) (e.g., integrally bladed rotor). The stator vanes may be arranged as stator assemblies that are mounted to the casing 208 or integrally formed therewith. The stator vanes of the stator 204 and the rotor blades of the rotors 202 are configured so that rotation of the rotors 202 draws the core flow air 214 from an upstream location (e.g., a fan section) and forces the core flow air 214 along the core flow path 210 (e.g., an annular passage). Rotation of rotor(s) 202 will accelerate the core flow air 214 and increase the dynamic pressure and temperature thereof.

In this illustrative configuration, downstream from the rotor(s) 202 and stator(s) 204 is an impeller 216. The impeller 216 is configured to receive and further compress, turn, and accelerate a combustor portion 218 of the core flow air 214 which is directed into a combustor section for combustion with fuel, as will be appreciated by those of skill in the art. As noted above, a portion of the core flow air 214 may be extracted as bleed air 220 into a bleed air cavity 222 (e.g., part of or fluidly connected to a bleed duct). The bleed air 220 is extracted or bled from the core flow air 214 in the core flow path 210 through one or more bleed apertures 224 and dumped into the bleed air cavity 222. As the bleed air 220 passes into the bleed air cavity 222, the bleed air 220 is decelerated and kinetic energy is recovered as static pressure. The bleed apertures 224 may be spaced circumferentially around the casing 208 and are located, in this illustrated configuration, immediately upstream of the impeller 216. As such, in this configuration, the bleed air 220 may be extracted at a location downstream of the last set or state of vanes of the stator(s) 204. It will be appreciated that bleed apertures 224 may be located at various other locations where bleed may be required, including, but not limited to, completely or partially between stator vanes or rotor blades or at a location on the impeller 216.

The bleed apertures 224 are formed within the material of the casing 208. As shown in FIG. 2, the bleed apertures 224 are formed downstream from a trailing edge of the vane/airfoil of the stator 204 (e.g., blade row). It may be beneficial to extract the bleed air at a location upstream from the trailing edge of the vanes. However, because the vanes are defined to extend inward and include a root that may be brazed to the casing 208 (or a vane assembly structure/ platform), there may be limited material space for forming the bleed apertures without impacting the structure of the vanes (or rotor 204) and/or the casing 208. In accordance with embodiments of the present disclosure, in view of the above and other considerations, the geometry of the slot (bleed aperture) may be shaped to maximum material spacing from edges of the slot and a stator vane root structure. For example, in accordance with some embodiments of the present disclosure, the slot can be kidney bean-shaped or long bean-shaped to mimic or mirror the contour and/or geometry of the passage between adjacent stator vanes of the stator. Such a geometry may achieve multiple benefits. For example, the material spacing from a vane mounting slot to the slot cutouts of the bleed apertures may be maximized. As another benefit, by following the same form or geometry as the vanes, the bleed slots may be aligned with the flow streamlines, reducing cross-slot flow and resultant discharge pressure loss.

Figure 3A:
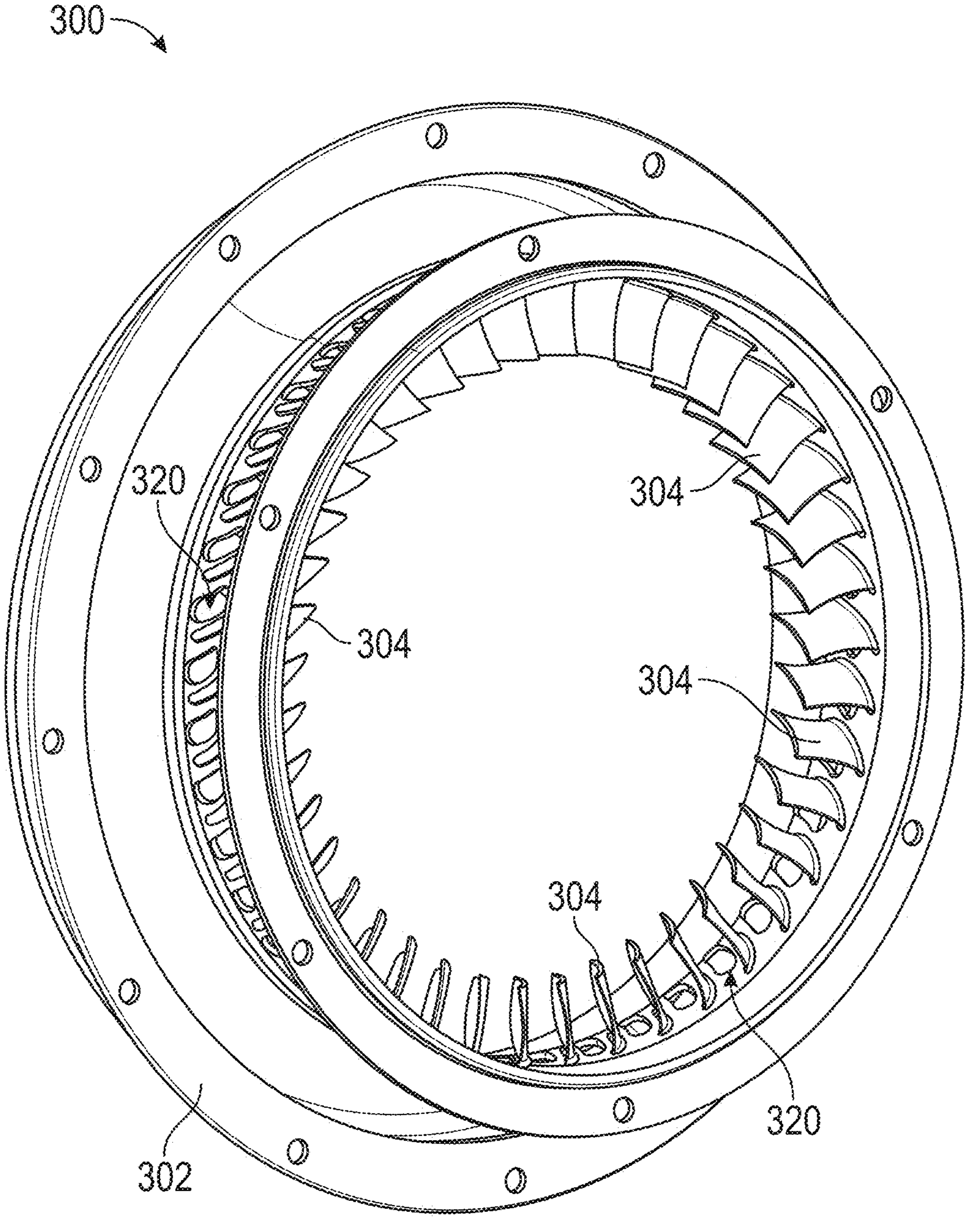
FIG. 3A is a schematic illustration of a stator assembly in accordance with an embodiment of the present disclosure.
Figure 3B:
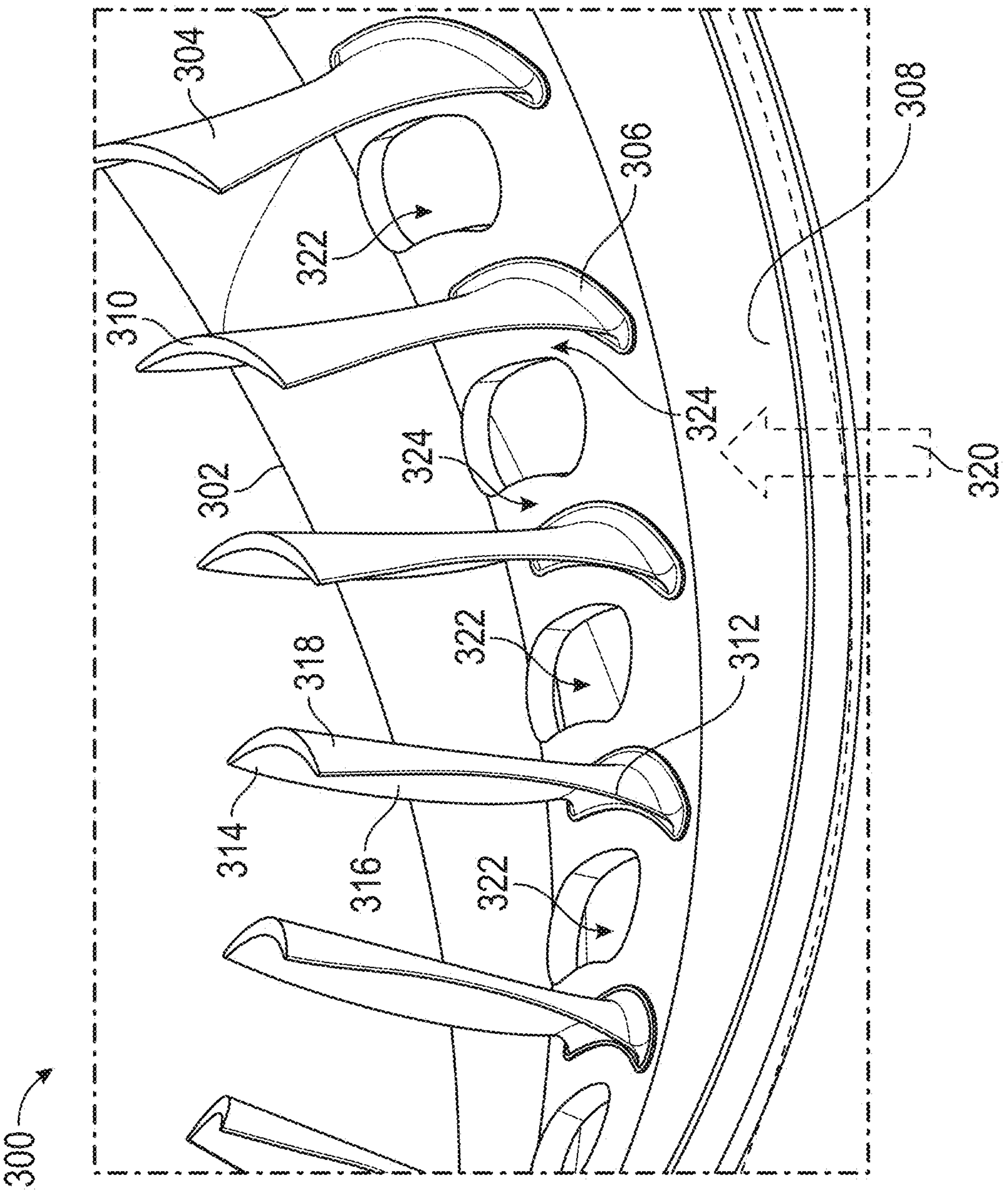
FIG. 3B is an enlarged illustration of a portion of the stator assembly shown in FIG. 3A.
Figure 3C:
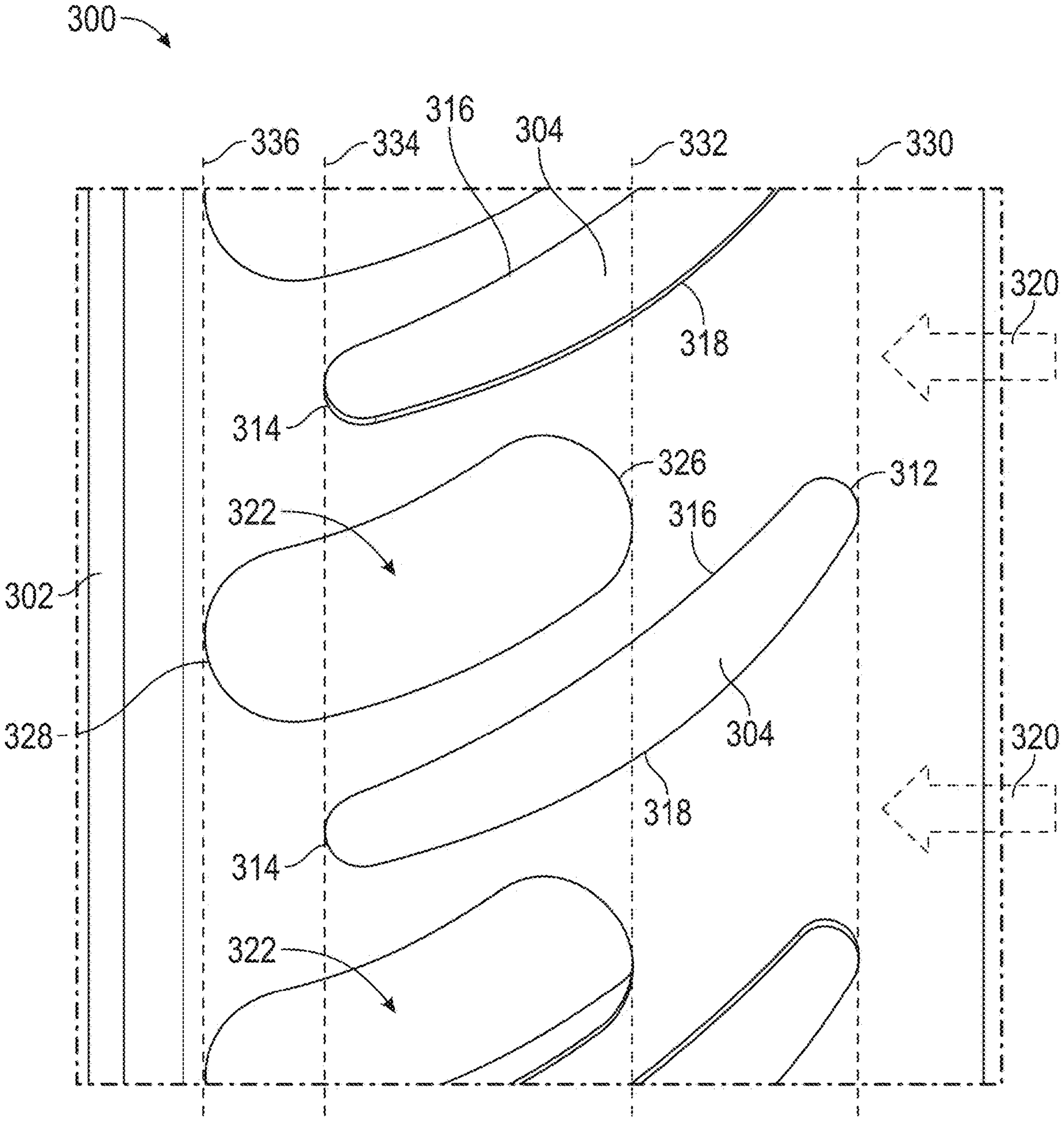
FIG. 3C is another view of a portion of the stator assembly shown in FIG. 3A.

Referring now to FIGS. 3A-3C, schematic illustrations of a stator assembly 300 in accordance with an embodiment of the present disclosure are shown. FIG. 3A illustrates a perspective view of a full hoop structure of the stator assembly 300, FIG. 3B illustrates an enlarged perspective view of the stator assembly 300, and FIG. 3C illustrates a radially inward view of stator assembly 300 illustrating a spacing between the features of the stator assembly 300. The stator assembly 300 includes a stator structure 302, which may be part of a housing or casing of a core flow or main gas path of a gas turbine engine. The stator structure 302 includes a plurality of stator vanes 304 extending radially inward from the stator structure 302. The stator vanes 304 are equally distributed or arranged about the circumference of the stator structure 302, and extend radially inward. Each stator vane 304 is installed into and attached to the stator structure 302 by brazing, welding, or similar attachment, or may be integrally formed with the stator structure 302.

As shown in FIGS. 3B-3C, the stator vanes 304 extend from a root 306 that engages with or attached to the stator structure 302. The stator structure 302 defines an inner diameter surface 308, which may define a part of a gas path surface of the gas turbine engine. The root 306 may include a braze or other attachment features to securely attach or connect the stator vane 304 to the stator structure 302. The stator vanes 304 extend radially inward from the root 306 to a tip 310 of the respective stator vanes 304. The stator vanes 304 are defined in an axial or flow direction, generally, between a leading edge 312 and a trailing edge 314. Normal or perpendicular to the axial or flow direction, the stator vanes 304 have a thickness between a pressure side 316 and a suction side 318. A core flow 320 will be directed into and through the stator assembly 300 in a flow direction generally indicated by the arrows of the core flow 320. It will be appreciated that the arrow is schematic only, and, in operation, the core flow would be roughly aligned with the vane leading edge, and the core flow may include an azimuthal component. The core flow 320 will interact with the leading edge 312 of stator vanes 304, pass along the pressure and suction sides 316, 318 and continue flowing in the flow direction past the trailing edge 314 of the stator vanes 304.

The stator vanes 304 are arranged about the stator structure 302. Between each adjacent set of stator vanes 304 is a respective bleed aperture 322. In other configurations, a bleed aperture may be provided between every other group of two stator vanes, or may be provided in other arrangements to achieve a desired amount of bleed air extraction and/or engine efficiency, for example. The bleed apertures 322 are formed within or defined in the material of the stator structure 302 and define through holes or openings that fluidly connect the core flow to a bleed air cavity that is defined radially outward from the stator structure 302 (e.g., as shown in FIG. 2). As such, a portion of the core flow 320 may be extracted through the bleed apertures 322 and then directed to other systems or locations, as described above. As shown in FIG. 3B, a portion of the inner diameter surface 308 of the stator structure 302 is present between edges of the bleed apertures 322, and is indicated as a surface span 324. That is, the bleed apertures 322 do not occupy 100% of the surface area between adjacent stator vanes 304, but rather a portion of the inner diameter surface 308 is present between edges of the root 306 of the stator vanes 340 and edges of the bleed apertures 322.

In some engine configurations, the amount of space between the adjacent stator vanes 304 may be limited such that conventional bleed apertures may not be possible to be formed (e.g., circular, oval, racetrack geometries). In accordance with embodiments of the present disclosure, the bleed apertures 322 are geometrically defined and shaped to correspond, at least partially, with the space or geometry that is dictated or defined by the stator vanes 304 on either side of the respective bleed aperture 322. As a result, in accordance with some embodiments of the present disclosure and as shown in FIGS. 3A-3C, the bleed apertures 322 are kidney bean-shaped or long bean-shaped to mimic or mirror the contour and/or geometry of the passage between adjacent stator vanes 304 of the stator assembly 300.

In accordance with embodiments of the present disclosure, the bleed apertures 322 may extend in an axial direction or flow direction from an aperture leading edge 326 to an aperture trailing edge 328, as shown in FIG. 3C. The axial position 330 of the leading edge 312 of the stator vane 304 is forward of the axial position 332 of the aperture leading edge 326 of the bleed aperture 322. Similarly, the axial position 334 of the trailing edge 314 of the stator vane 304 is forward of the axial position 336 of the aperture trailing edge 328 of the bleed aperture 322. Furthermore, as shown, the bleed aperture 322 has a general curvature that substantially parallels or mimics the curvature of the pressure side 316 and suction side 318 of the two adjacent stator vanes 304 on either side of the bleed aperture 322. The specific shape and geometry of the bleed apertures 322 may be defined based on a camber line of the adjacent stator vanes 304. The vane camber line is an arcuate line that is defined along the body of the respective airfoil of the stator vanes 304 from the leading edge 312 to the trailing edge 314 and is equidistant between the pressure side 316 and the suction side 318. That is, in a general sense, a line drawn normal or perpendicular to the camber line of a given stator vane 304 is substantially equal in length both to the pressure side 316 and the suction side 318.

Figure 4A:
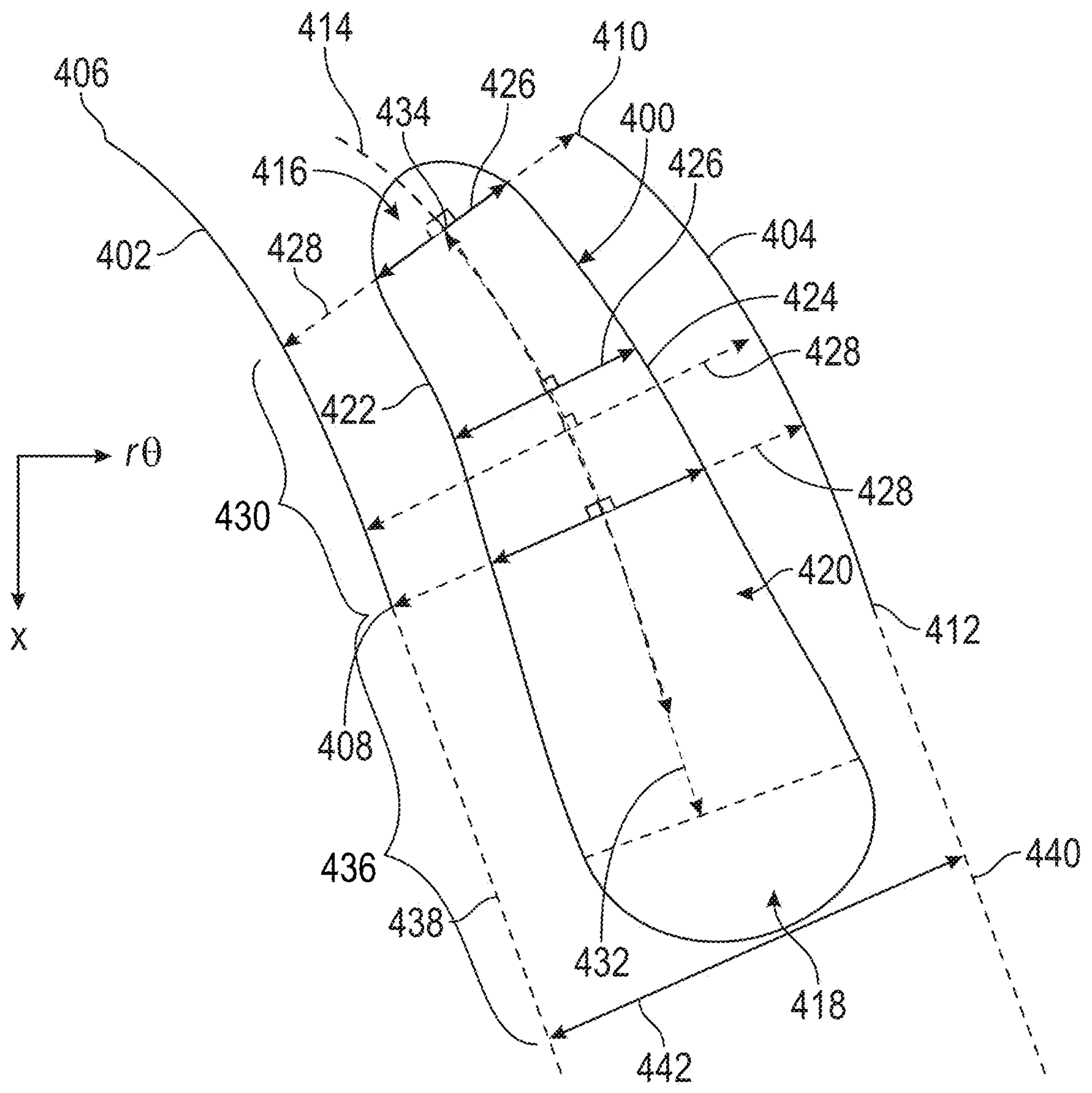
FIG. 4A is a schematic illustration of a portion of a stator assembly in accordance with another embodiment of the present disclosure.
Figure 4B:
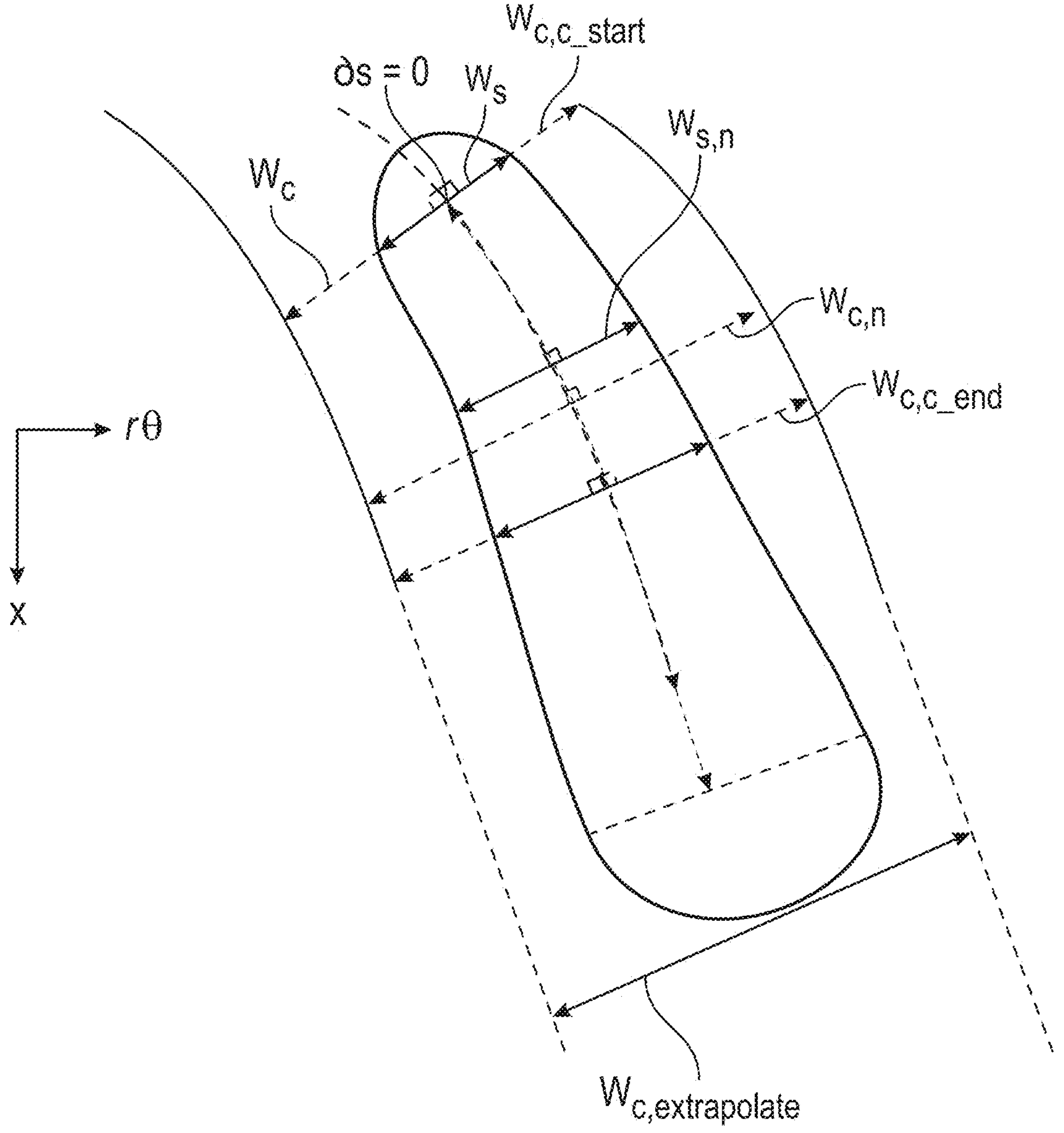
FIG. 4B is another schematic illustration of the portion of the stator assembly of FIG. 4A, indicating various parameters of a bleed aperture in accordance with an embodiment of the present disclosure.

Referring now to FIGS. 4A-4B, schematic diagrams of a bleed aperture 400 arranged relative to a first vane camber line 402 and a second vane camber line 404 are shown. The first vane camber line 402 is representative of a camber line through a first stator vane (not shown) on a first side of the bleed aperture 400 and the second camber line 404 is representative of a camber line through a second stator vane (not shown) on a second side of the bleed aperture 400. It will be appreciated that the respective stator vanes are wider in the re direction (circumferential direction) than that indicated in the figure, and FIGS. 4A-4B are merely schematic. As a result, it will be appreciated that the vane camber lines 402, 404 are not representative of the distance between an edge or root of the respective stators vanes. Further, FIGS. 4A-4B are thus schematic in nature, as the full stator vane structures are not shown, and the relative dimensions and distances are defined herein, with the schematic illustrations of FIGS. 4A-4B being for illustrative purposes only.

For example, in this illustrative schematic, the first camber line 402 extends from a first leading edge 406 to a first trailing edge 408, with the first leading edge 406 and the first trailing edge 408 being defined at the respective leading and trailing edges of the stator vane, and thus the first leading edge 406 and the first trailing edge 408 are representative of the axial and circumferential positions of the leading and trailing edges of the respective (not shown) first stator vane. Similarly, the second camber line 404 extends from a second leading edge 410 to a second trailing edge 412, with the second leading edge 410 and the second trailing edge 412 being defined at the respective leading and trailing edges of the stator vane, and thus the second leading edge 410 and the second trailing edge 412 are representative of the axial and circumferential positions of the leading and trailing edges of the respective (not shown) second stator vane.

The bleed aperture 400 is a hole or opening formed in a stator structure between the stator vanes that define the first and second camber lines 402, 404. Between the two stator vanes is a mid-channel line 414 that is defined as equidistant between the first and second camber lines 402, 404 and follows the parallel contours of the two camber lines 402, 404. The mid-channel line 414 thus has the same geometry or arcuate curve as the two camber lines 402, 404. It will be appreciated that in some engine configurations structures may have linear camber lines (e.g., struts), and in such instances, the mid-channel line would have the same geometry (i.e., linearity).

The bleed aperture 400 is defined by three sections. A leading edge section 416 is defined at the forward end of the bleed aperture 400 and a trailing edge section 418 is defined at an aft end of the bleed aperture 400. Between the leading edge section 416 and the trailing edge section 418 is a primary aperture section 420. The primary aperture section 420 is defined by two aperture sidewalls 422, 424 that run axially and, in some embodiments, parallel with the mid-channel line 414. As such, in some embodiments, the two aperture sidewalls 422, 424 do not get closer together in a flow direction (from the leading edge section 416 to the trailing edge section 418), along a path or length between the two adjacent stator vanes. In other configurations, the two aperture sidewalls may deviate from parallel with the mid-channel line (e.g., grow or shrink in relative distance from the mid-channel line). The aperture sidewalls may be defined or formed by a surface of the stator structure extending radially relative to the engine axis. That is, the aperture sidewalls have a thickness equal to the material thickness of the stator structure in which they bleed aperture 400 is formed.

The leading edge section 416 of the bleed aperture 400 is defined as a leading edge feature where the aperture sidewalls 422, 424 are not parallel with the mid-channel line 414 and curve toward each other to join together at the mid-channel line 414 at the forward end of the bleed aperture 400. Similarly, the trailing edge feature is defined where the aperture sidewalls 422, 424 are not parallel with the mid-channel line 414 and curve toward each other to join together at the mid-channel line 414 at the aft end of the bleed aperture 400. As such, there is a change in curvature of the aperture sidewalls 422, 424 at the start or transition from the primary aperture section 420 to the respective leading edge section 416 and trailing edge section 418. In embodiments that do not include curved or arcuate leading and trailing edge sections 416, 418, the transition from the primary aperture section 420 may be more abrupt. For example, in some embodiments, the leading and trailing edge sections 416, 418 may be squared or straight-edged, resulting in no curvature transition but rather an angled transition from the primary aperture section 420 to the leading and/or trailing edge sections 416, 418.

The mid-channel line 414, in this embodiment, is aligned with an aperture center line or a line that is defined through the bleed aperture 400. As the two lines are overlapping, such are not separately illustrated. The aperture center line may thus be represented by the mid-channel line 414 in this embodiment. The aperture center line is a line extending through the bleed aperture 400 that extends from a leading edge or forward end of the bleed aperture 400 to a trailing edge or aft end of the bleed aperture 400, with the sidewalls 422, 424 being substantially equidistant from the aperture center line. Although shown with the aperture center line aligned with the mid-channel line 414, such configuration is not intended to be limiting. For example, in some embodiments, the aperture center line may be offset from the mid-channel line toward one of the first or second camber lines of the adjacent stator vanes.

In the configuration shown in FIGS. 4A-4B, the bleed aperture 400 has a slot width 426 ($w_s$) that is defined as a distance between the aperture sidewalls 422, 424 along a line normal to the mid-channel line 414. A channel width 428 ($w_c$) is defined as a distance between the two camber lines 402, 404 of the adjacent stator vanes with the bleed aperture 400 located therebetween, with the distance of the channel width 428 ($w_c$) measured along a line normal to the mid-channel line 414. A covered portion 430 is defined as a region of the channel between the adjacent stator vanes that has a forward end defined at a covered start point ($w_{c,c\_start}$) where the channel width 428 ($w_c$) line intersects both the first vane camber line 402 and the second vane camber line 404. The covered start point ($w_{c,c\_start}$), as shown, is defined at a line normal to the mid-channel line 414 and intersects the first vane camber line 402 and the leading edge 410 point of the second camber line 404. The covered potion 430 ends at a covered end point ($w_{c,c\_end}$) which is defined at a line normal to the mid-channel line 414 and intersects the first vane camber line 402 at the first trailing edge 408 thereof and intersects a point of the second camber line 404. The covered portion 430 encompasses a region or portion of the primary aperture section 420 that is between surfaces of the adjacent stator vanes.

In accordance with embodiments of the present disclosure, the leading edge section 416 and trailing edge section 418 of the bleed aperture 400 can have various geometries, curvatures, angled walls/surfaces, or the like, to aid in extraction of bleed air from a gas path into a bleed air cavity (see, e.g., FIG. 2). For example, and without limitation, the curvature or geometric shape of the leading edge section 416 and trailing edge section 418 of the bleed aperture 400 can be square, round, elliptical, triangular, tapered, or the like. In the illustrated configuration of FIGS. 4A-4B, the leading edge section 416 and trailing edge section 418 each have rounded geometries that curve and intersect from the two aperture sidewalls 422, 424 at the mid-channel line 414. Additionally, the material surfaces, from the gas path side of the stator structure to the bleed air cavity side, may be angled in a flow direction, rather than radially oriented.

A primary slot length 432, in a flow direction, is measured from the forward end of the primary aperture section 420, which is defined at the aft or downstream end of the leading edge section 416. The primary slot length 432 extends from the forward end of the primary aperture section 420 and ends at the start of trailing edge section 418 at an aft end of the primary aperture section 420. A primary slot start point 434 (at point ∂s=0) defines the start point of the primary aperture section 420 relative to the covered start point ($w_{c,c_{start}}$). In this illustrative configuration, the primary slot start point 434 is aligned with the covered start point ($w_{c,c_{start}}$). As such, the primary slot start point 434 may be defined at position ∂s=0. The primary slot start point 434 is not limited to being aligned with the covered start point ($w_{c,c_{start}}$), but rather may be located downstream from the covered start point ($w_{c,c_{start}}$). As such, in other embodiments, the primary slot start point 434 may be at a position that is greater than zero relative to the covered start point ($w_{c,c_{start}}$) (i.e., ∂s>0).

As described above, the channel width 428 ($w_c$) is measured normal to the mid-channel line 414 and extends between the two camber lines 402, 404, and similarly, the slot width 426 ($w_s$) is measured normal to the mid-channel line 414 and extends between the two aperture sidewalls 422, 424. A slot width percentage SW % is measured as $$SW\ \% = \frac{w_{s,n}}{w_{c,n}} * 100\%,$$

which defines the percentage of the distance from the first vane camber line 402 to the second vane camber line 404, normal to the mid-channel line 414, that is open and defined by the bleed aperture 400, with n being a position along the mid-channel line 414. In accordance with embodiments of the present disclosure, the slot width percentage SW % is constrained between 20%-90% along the length of the bleed aperture within the covered portion 430 (i.e., between $w_{c,c\_start}$ and $w_{c,c\_end}$) and is allowed to vary in the streamwise direction of the bleed aperture 400. The slot width percentage SW % is a function of the streamwise position, and is not necessarily a constant value along the streamwise length of the bleed aperture 400. In some embodiments, the slot width percentage SW % may be between 35%-70% within the covered portion 430. In still further embodiments, the slot width percentage SW % may be 60% within the covered portion 430.

The primary slot length 432 can be any length and may extend past the trailing edges 408, 412 of the respective stator vanes. For example, as shown, the primary slot length 432 extends from the primary slot start point 434 (∂s=0), past the covered end point ($w_{c,c\_end}$), and continues to extend past the axial position of the trailing edges 408, 412. As shown in FIGS. 4A-4B, the bleed aperture 400, including the primary aperture section 420, extends aft of the downstream ends of the stator vanes. In this downstream region, the bleed aperture 400 is shaped and sized to stay within an extended channel region 436 that is defined between extrapolated vane camber lines (e.g., first extrapolated vane camber line 438 and second extrapolated vane camber line 440). The extended channel region 436 has a width defined by the two extrapolated vane camber line 438, 440 which extend as continued arcs or lines from the respective trailing edges 408, 412.

In accordance with embodiments of the present disclosure, the slot width 426 ($w_s$) and/or the slot width percentage SW % can be constant or vary along the primary slot length 432. In the extended channel region 436, the slot width 426 ($w_s$) may continue in the same manner as the slot width 426 ($w_s$) within the covered portion 430. With respect to the slot width percentage SW %, at locations in the extended channel region 436, the slot width percentage SW % is based on the relationship with the extrapolated vane camber lines 438, 440, as indicated by the extrapolated channel width 442 ($w_{c,extrapolate}$). In some configurations, the slot width 426 ($w_s$) may not constrained aft of or downstream of the end of the covered portion 430.

Figure 5:
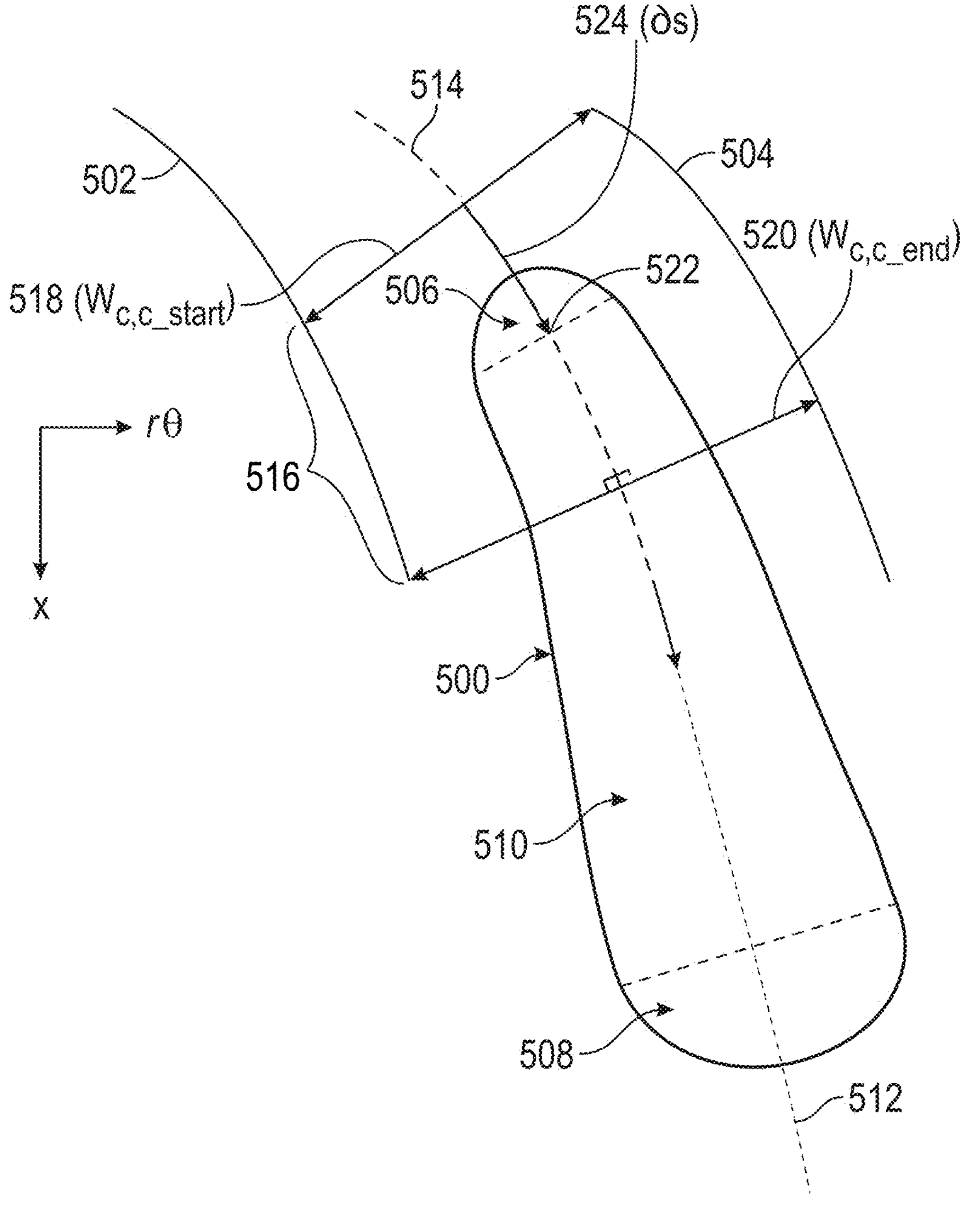
FIG. 5 is a schematic illustration of a portion of a stator assembly in accordance with another embodiment of the present disclosure.

As noted above, the primary slot start point 434 (∂s) may be aligned with the covered start point ($w_{c,c\_start}$), such that ∂s=0. In accordance with other embodiments, the primary slot start point may be offset from the covered start point. For example, with reference to FIG. 5, a schematic diagram of a bleed aperture 500 arranged relative to a first vane camber line 502 and a second vane camber line 504 is shown. The first vane camber line 502 is representative of a camber line through a first stator vane (not shown) on a first side of the bleed aperture 500 and the second camber line 504 is representative of a camber line through a second stator vane (not shown) on a second side of the bleed aperture 500. It will be appreciated that the respective stator vanes are wider in the re direction (circumferential direction) than that indicated in the figure, and FIG. 5 is merely schematic. The bleed aperture 500 may be substantially similar to that shown and described with respect to FIGS. 4A-4B, having a leading edge section 506, a trailing edge section 508, and a primary aperture section 510 defined therebetween.

As shown, the bleed aperture 500 defines an aperture center line 512 that is aligned with a mid-channel line 514 that is defined as equidistant between the first and second camber lines 502, 504 and follows the parallel contours of the two camber lines 502, 504. A covered portion 516 is defined as a region of the channel between the adjacent stator vanes that has a forward end defined at a covered start point 518 ($w_{c,c\_start}$) and extends to a covered end point 520 ($w_{c,c\_end}$). Each of the covered start point 518 ($w_{c,c\_start}$) and the covered end point 520 ($w_{c,c\_end}$) are defined by lines normal to the mid-channel line 514, as defined above. In this illustrative configuration, a primary slot start point 522 defines the start point of the primary aperture section 510 relative to the covered start point 518 ($w_{c,c\_start}$). In this illustrative configuration, the primary slot start point 522 is offset from or downstream of the covered start point 518 ($w_{c,c_{start}}$) by an offset distance 524 (∂s) which is greater than zero.

In this configuration, the leading edge section 506 is located downstream, in a flow direction, from the covered start point 518 ($w_{c,c\_start}$). The bleed aperture 500 of FIG. 5 is substantially similar to the bleed aperture 400 of FIGS. 4A-4B, but shifted aftward in the flow direction. As a result, a larger portion or percentage of the bleed aperture 500 is located aft or downstream of the covered end point 520 ($w_{c,c\_end}$). In accordance with embodiments of the present disclosure, the most forward location of the primary slot start point is aligned with the covered start point ($w_{c,c\_start}$), although it may be offset in a streamwise direction by a separation or offset distance (∂s). Furthermore, in accordance with embodiments of the present disclosure, the most aft or downstream location of the primary slot start point is aligned with the covered end point ($w_{c,c\_end}$). In accordance with embodiments of the present disclosure, the most forward location of the trailing edge section, such as shown in FIGS. 4-5, is located aft of or downstream from the covered end point 520 ($w_{c,c\_end}$).

Figure 6:
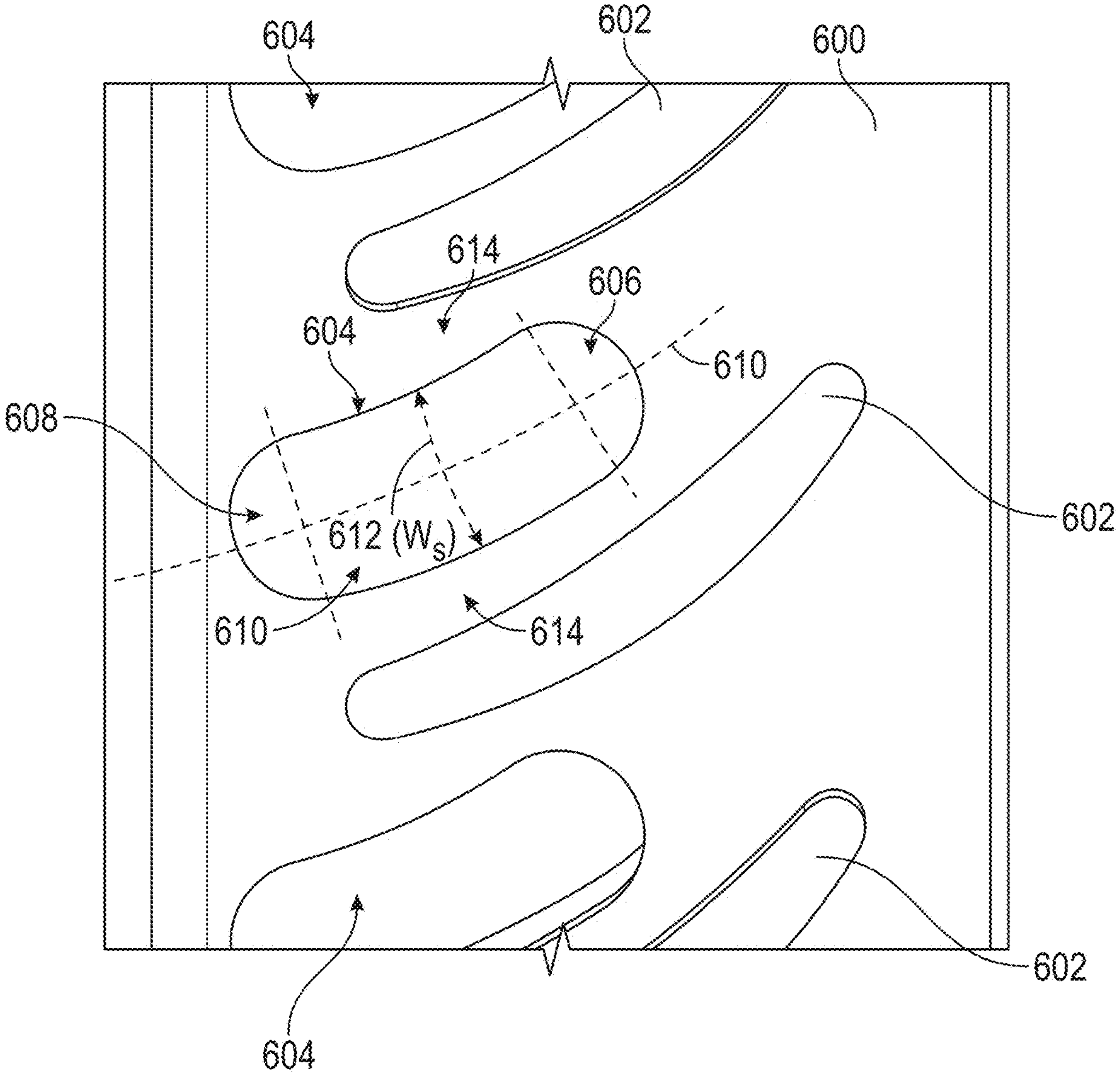
FIG. 6 is a schematic illustration of a portion of a stator assembly in accordance with another embodiment of the present disclosure.

As noted above, the slot width ($w_s$) may be constant along the length of the primary aperture section. This is illustratively shown in FIG. 6, which illustrates a stator structure 600 having a set of stator vanes 602 and bleed apertures 604 arranged therebetween. Each of the bleed apertures 604 defines a leading edge section 606, a trailing edge section 608, and a primary aperture section 610 defined therebetween. The primary aperture section 610 may be defined as having a slot width ($w_s$) 612 that is constant along the length of the primary aperture section 610. As a result, a surface span 614 defined between edges of the primary aperture section 610 and the adjacent stator vanes 602 is variable due to the tapering and shape of the stator vanes 602. Alternatively described, a constant slot width results in a slot width percentage SW % that either decreases as the camber line turns toward the axial directions (compressors) or increases as the camber line turns away from axial (turbines).

Figure 7:
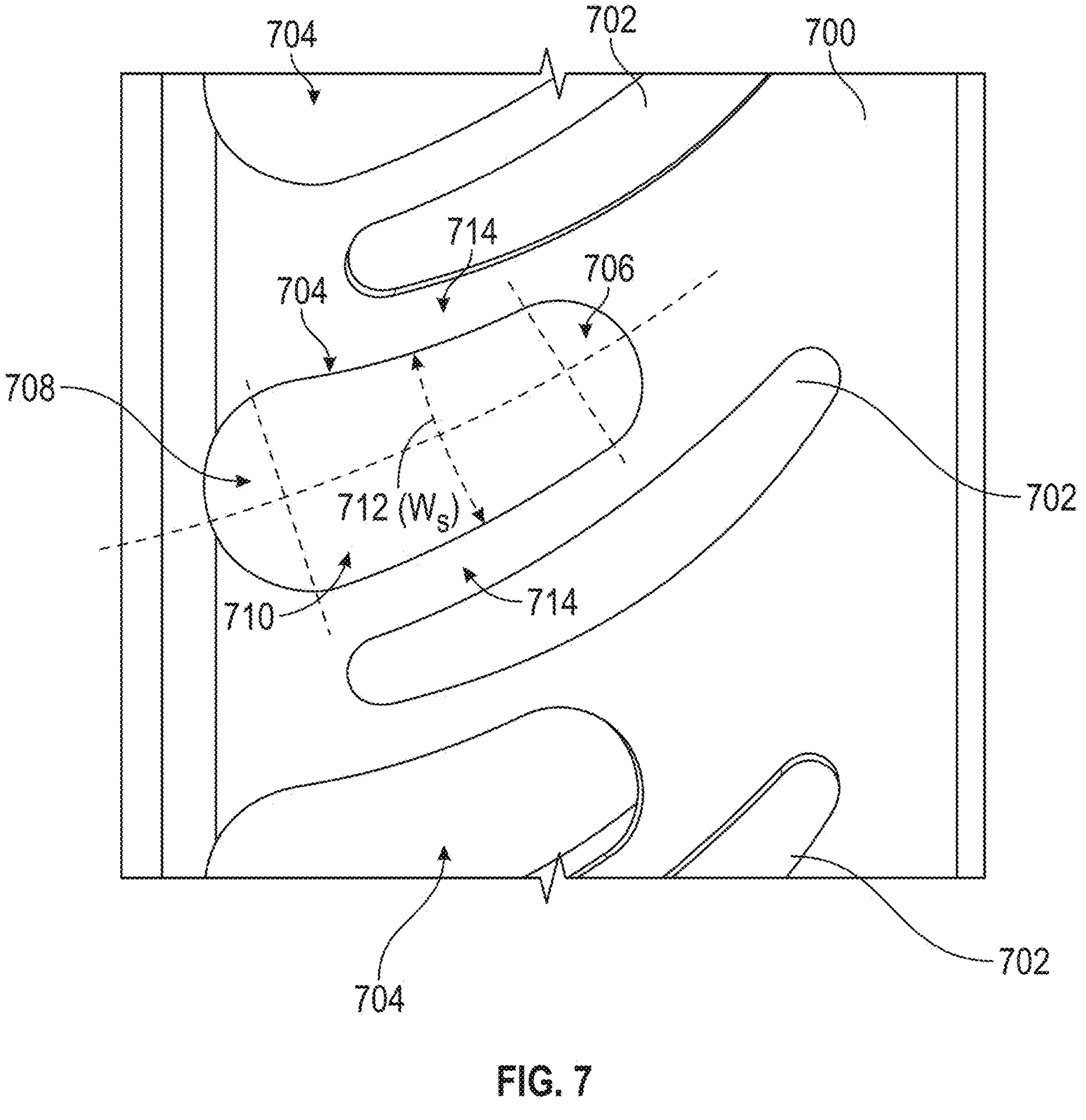
FIG. 7 is a schematic illustration of a portion of a stator assembly in accordance with another embodiment of the present disclosure.

In contrast, with reference to FIG. 7, a stator structure 700 having a set of stator vanes 702 and bleed apertures 704 arranged therebetween in accordance with an embodiment of the present disclosure illustrates a configuration with a constant slot width percentage SW %. Each of the bleed apertures 704 defines a leading edge section 706, a trailing edge section 708, and a primary aperture section 710 defined therebetween. The primary aperture section 710 may be defined as having a slot width ($w_s$) 712 that is variable along the length of the primary aperture section 710, but with a constant slot width percentage SW %. As a result, in accordance with some configurations, a surface span 714 defined between edges of the primary aperture section 710 and the adjacent stator vanes 702 is substantially constant.

Figure 8:
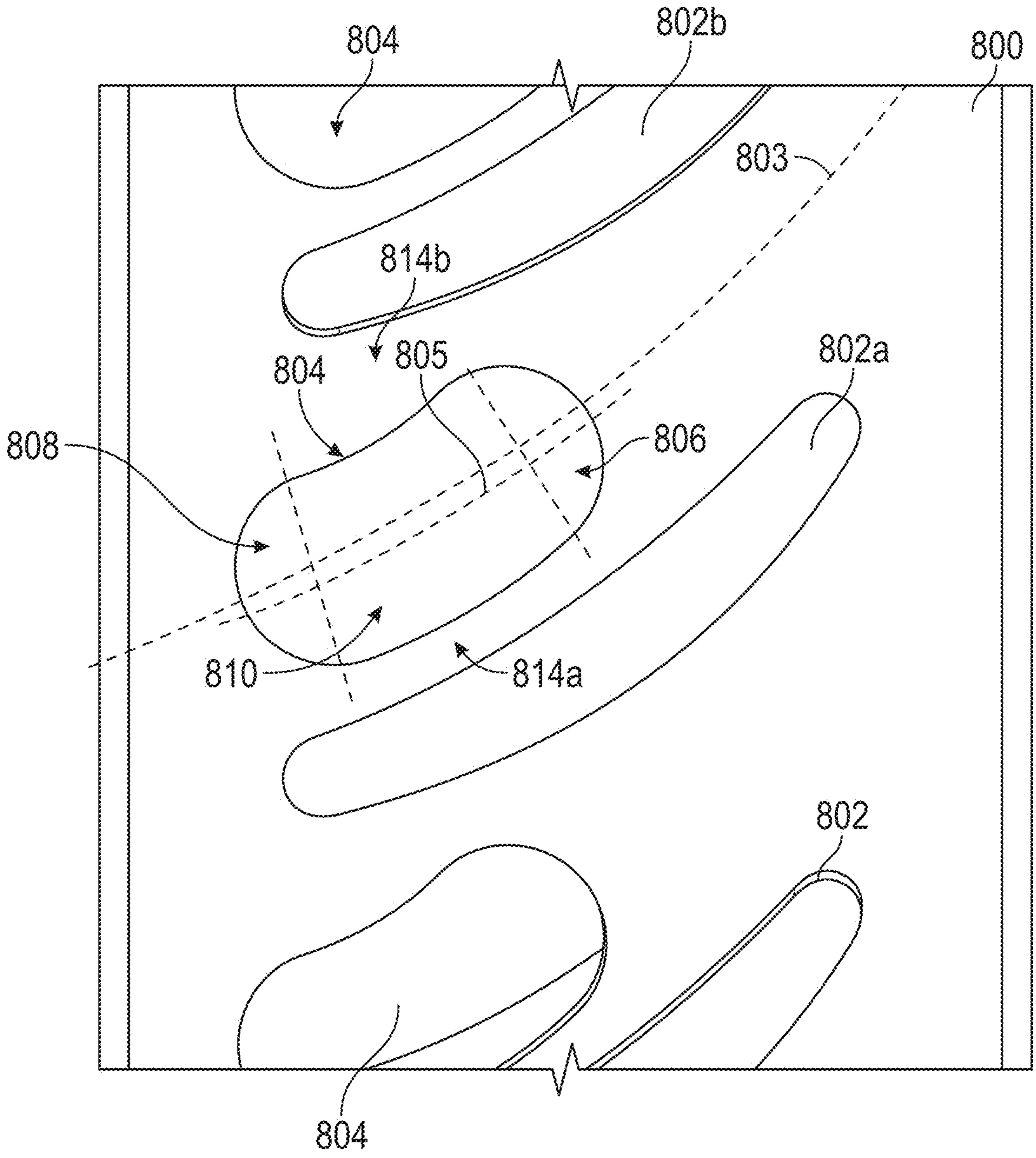
FIG. 8 is a schematic illustration of a portion of a stator assembly in accordance with another embodiment of the present disclosure.

Turning now to FIG. 8, a stator structure 800 having a set of stator vanes 802 and bleed apertures 804 arranged therebetween in accordance with an embodiment of the present disclosure illustrates a configuration with the bleed apertures 804 being offset from a mid-channel line 803 by an offset distance 805. Each of the bleed apertures 804 defines a leading edge section 806, a trailing edge section 808, and a primary aperture section 810 defined therebetween. The bleed aperture 804 is offset from being centered between adjacent stator vanes 802 by the offset distance 805. Such an offset or off-centering results in a surface span 814*a*, 814*b* defined between edges of the bleed aperture 804 and the adjacent stator vanes 802 to be different. For example, in the configuration illustrated in FIG. 8, due to the offset distance 805 the bleed aperture 804 is arranged closer to the pressure side of a first stator vane 802*a* and farther from a suction side of a second stator vane 802*b*. This causes a first surface span 814*a* to be smaller in dimension than a dimension of a second surface span 814*b*. It will be appreciated that the aperture center line may be biased toward one of the two adjacent stator vanes, and there is no requirement that the aperture center line be aligned with a mid-channel line.

Figure 9:
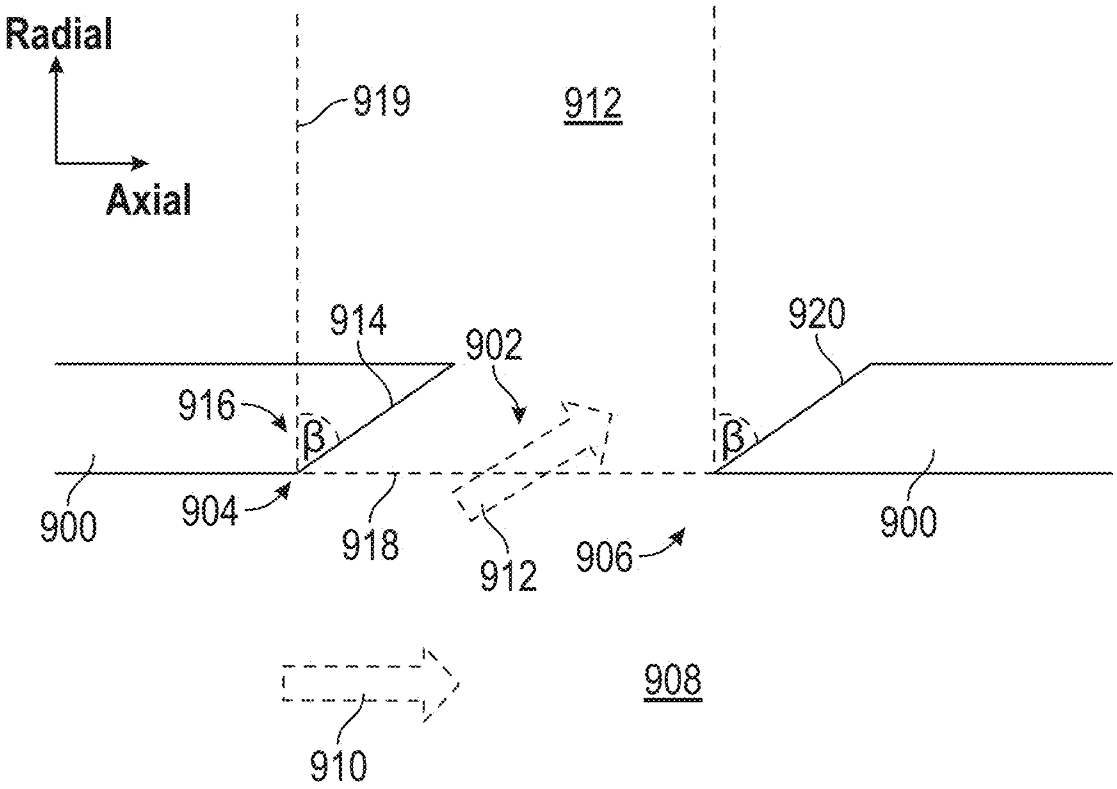
FIG. 9 is a schematic illustration of a portion of a stator assembly in accordance with another embodiment of the present disclosure.

Referring now to FIG. 9, a cross-sectional view of a portion of a stator structure 900 in accordance with an embodiment of the present disclosure is shown. The stator structure 900 may be similar to the above-described embodiments, having a bleed aperture 902 formed in the stator structure 900. In the configuration of FIG. 9, an angled orientation of sidewalls of the bleed aperture 902 are shown, particularly at a leading edge section 904 and a trailing edge section 906. The bleed aperture 902 provides fluid connection or communication between a gas path 908 containing a core flow air 910 and a bleed air cavity 912. A portion of the core flow air 910 is extracted through the bleed aperture 902 as bleed air 912. As shown, at the leading edge section 904, a leading edge end wall 914 of the bleed aperture 902 may be angled axially at a first angle 916 relative to a radial line, with line 918 being parallel with the engine axis (axial) and line 919 being radial relative to the engine axis (radial). The first angle 916 may be an angle β that is oriented at an angle of 0-60 degrees. At a 0 degree angle, the leading edge section 904 will be radially oriented. A trailing edge end wall 920 of the bleed aperture 902 may be similarly angled, but defining an aft wall. As such, in the illustrated embodiment of FIG. 9, the leading edge end wall 914 and the trailing edge end wall 920 may be substantially parallel with each other. In other embodiments, the two end walls 914, 920 may be angled at different angles from each other.

In view of the above, it will be appreciated that the bleed slots described herein may be positioned and sized to achieve desired bleed air extraction while minimizing the impact to the stator structure. That is, the amount of material or surface area between bleed apertures and adjacent stator vanes may be maximized by configuring the bleed apertures in accordance with the teachings herein. For example, shaping the bleed apertures to align or be arranged parallel with a mid-channel line and controlling the slot width, allows for maximum bleed air extraction while allowing for increased numbers of stator vanes and/or smaller overall systems. The specific shape and location of the bleed apertures may be adjusted based on pressure profiles of the specific engine configuration or gas turbine engine component.

In accordance with embodiments of the present disclosure, to maximize the material spacing from a bleed aperture to an adjacent stator vane, the bleed aperture can be kidney bean or long bean shape to mimic or mirror the passages defined between the adjacent stator vanes. Such configurations, in accordance with embodiments of the present disclosure, achieves various benefits. For example, and without limitation, the material spacing between edges or sidewalls of the bleed apertures and adjacent stator vanes may be maximized. Another benefit of embodiments of the present disclosure is that by following the same form as the stator vanes, the bleed apertures will be aligned with the flow of gases through the stator structure. Such alignment and orientation can reducing cross-slot flow and resultant discharge pressure losses. Furthermore, due to the unique shape and arrangement of the bleed apertures of the present disclosure, maximizing of material (i.e., no pinch points) between the stator vane and the bleed aperture is achieved, which results in lower stress.

The use of the terms “a”, “an”, “the”, and similar references in the context of description (especially in the context of the following claims) are to be construed to cover both the singular and the plural, unless otherwise indicated herein or specifically contradicted by context. The modifier “about” used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as “forward,” “aft,” “upper,” “lower,” “above,” “below,” and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A stator assembly for a gas turbine engine comprising:

a stator structure configured to be arranged about an engine axis;

a plurality of stator vanes extending radially inward from the stator structure, wherein each stator vane defines a respective vane camber line; and a plurality of bleed apertures defined in the stator structure, with one bleed aperture defined between each set of two adjacent stator vanes of the plurality of stator vanes, wherein a first bleed aperture of the plurality of bleed apertures is defined between a first stator vane having a first vane camber line and a second stator vane having a second vane camber line, wherein a channel is defined between the first stator vane and the second stator vane;

wherein a mid-channel line is defined as equidistant between the first vane camber line and the second vane camber line and follows a parallel contour of the first and second vane camber lines;

wherein the channel defines a covered portion defined as a region between the first stator vane and the second stator vane and defined at a forward end by a line from a leading edge of the second stator vane drawn normal to the mid-channel line and extending to the first stator vane camber line and at an aft end by a line from a trailing edge of the first stator vane drawn normal to the mid-channel line and extending to the second stator vane camber line;

wherein the first bleed aperture defines an aperture center line and comprises:

a leading edge section defined at an upstream end of the first bleed aperture;

a trailing edge section defined at a downstream end of the first bleed aperture; and a primary aperture section defined between the leading edge section and the trailing edge section, wherein the primary aperture section has a forward end no farther forward than the forward end of the covered portion and the primary aperture section has an aft end no farther forward than the aft end of the covered portion, wherein the trailing edge section of the first bleed aperture extends aft of an axial position of the trailing edges of the plurality of stator vanes.

2. The stator assembly of claim 1, wherein the primary aperture section is defined between a first aperture sidewall formed by a surface of the stator structure extending radially relative to the engine axis and second aperture sidewall formed by a surface of the stator structure extending radially relative to the engine axis.

3. The stator assembly of claim 2, wherein the leading edge section is defined by extensions of the first aperture sidewall and the second aperture sidewall that converge toward the aperture center line forward of the forward end of the primary aperture section.

4. The stator assembly of claim 3, wherein the leading edge section is rounded.

5. The stator assembly of claim 2, wherein the trailing edge section is defined by extensions of the first aperture sidewall and the second aperture sidewall that converge toward the aperture center line aft of the aft end of the primary aperture section.

6. The stator assembly of claim 5, wherein the trailing edge section is rounded.

7. The stator assembly of claim 1, wherein the forward end of the primary aperture section is aligned with the forward end of the covered portion.

8. The stator assembly of claim 1, wherein the forward end of the primary aperture section is located aft of the forward end of the covered portion.

9. The stator assembly of claim 1, wherein the primary aperture section is defined by two sidewalls that are a constant distance from the aperture center line along a length of the primary aperture section.

10. The stator assembly of claim 1, wherein the primary aperture section is defined by two sidewalls that are variable distances from the aperture center line along a length of the primary aperture section.

11. The stator assembly of claim 1, wherein the aperture center line is aligned with the mid-channel line.

12. The stator assembly of claim 1, wherein the aperture center line is defined parallel with the mid-channel line.

13. The stator assembly of claim 12, wherein the aperture center line is offset from the mid-channel line and closer to the first vane camber line than the second vane camber line.

14. A gas turbine engine comprising:

a compressor section, a combustor section, and a turbine section arranged along an engine axis, wherein at least one of the compressor section and the turbine section comprise a stator structure to be arranged about the engine axis;

a plurality of stator vanes extending radially inward from the stator structure, wherein each stator vane defines a respective vane camber line; and a plurality of bleed apertures defined in the stator structure, with one bleed aperture defined between each set of two adjacent stator vanes of the plurality of stator vanes, wherein a first bleed aperture of the plurality of bleed apertures is defined between a first stator vane having a first vane camber line and a second stator vane having a second vane camber line, wherein a channel is defined between the first stator vane and the second stator vane;

wherein a mid-channel line is defined as equidistant between the first vane camber line and the second vane camber line and follows a parallel contour of the first and second vane camber lines;

wherein the channel defines a covered portion defined as a region between the first stator vane and the second stator vane and defined at a forward end by a line from a leading edge of the second stator vane drawn normal to the mid-channel line and extending to the first stator vane camber line and at an aft end by a line from a trailing edge of the first stator vane drawn normal to the mid-channel line and extending to the second stator vane camber line;

wherein the first bleed aperture defines an aperture center line and comprises:

a leading edge section defined at an upstream end of the first bleed aperture;

a trailing edge section defined at a downstream end of the first bleed aperture; and a primary aperture section defined between the leading edge section and the trailing edge section, wherein the primary aperture section has a forward end no farther forward than the forward end of the covered portion and the primary aperture section has an aft end no farther forward than the aft end of the covered portion, wherein the trailing edge section of the first bleed aperture extends aft of an axial position of the trailing edges of the plurality of stator vanes.

15. The gas turbine engine of claim 14, wherein the primary aperture section is defined between a first aperture sidewall formed by a surface of the stator structure extending radially relative to the engine axis and second aperture sidewall formed by a surface of the stator structure extending radially relative to the engine axis.

16. The gas turbine engine of claim 14, wherein the forward end of the primary aperture section is located aft of the forward end of the covered portion.

17. The gas turbine engine of claim 14, wherein the primary aperture section is defined by two sidewalls that are a constant distance from the aperture center line along a length of the primary aperture section.

18. The gas turbine engine of claim 14, wherein the primary aperture section is defined by two sidewalls that are variable distances from the aperture center line along a length of the primary aperture section.

19. The gas turbine engine of claim 14, wherein the aperture center line is aligned with the mid-channel line.

20. The gas turbine engine of claim 14, wherein the aperture center line is defined parallel with the mid-channel line.

* * * * *